US012236852B2

(12) United States Patent
Jeong et al.

(10) Patent No.: US 12,236,852 B2
(45) Date of Patent: Feb. 25, 2025

(54) LIGHT EMITTING DISPLAY APPARATUS GENERATING VARIABLE DRIVING FREQUENCY BASED ON IMAGE AND CURRENT CHANGE AMOUNT

(71) Applicant: LG Display Co., Ltd., Seoul (KR)

(72) Inventors: Uitaek Jeong, Paju-si (KR); MooKyoung Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/450,889

(22) Filed: Aug. 16, 2023

(65) Prior Publication Data

US 2024/0221620 A1 Jul. 4, 2024

(30) Foreign Application Priority Data

Dec. 28, 2022 (KR) ........................ 10-2022-0187463

(51) Int. Cl.
*G09G 3/32* (2016.01)

(52) U.S. Cl.
CPC ....... *G09G 3/32* (2013.01); *G09G 2310/0275* (2013.01); *G09G 2330/021* (2013.01)

(58) Field of Classification Search
CPC ............. G09G 3/32; G09G 2310/0275; G09G 2330/021; G09G 3/3233; G09G 3/3266; G09G 3/2092; G09G 5/005; G09G 3/3225; G09G 3/3648; G09G 3/20; G09G 5/393; G09G 3/36; G09G 5/395
See application file for complete search history.

(56) References Cited

U.S. PATENT DOCUMENTS

| | | | | |
|---|---|---|---|---|
| 9,666,119 | B2 | 5/2017 | Drzaic | |
| 11,069,323 | B2 | 7/2021 | Her et al. | |
| 2015/0154908 | A1* | 6/2015 | Nam | G09G 3/3233 345/76 |
| 2016/0125785 | A1* | 5/2016 | Wang | G09G 3/3648 345/582 |
| 2016/0196802 | A1* | 7/2016 | Nho | G09G 3/20 345/212 |
| 2017/0316738 | A1* | 11/2017 | Sohn | G09G 3/3266 |
| 2018/0047335 | A1* | 2/2018 | Hwang | G09G 3/2092 |
| 2018/0261191 | A1* | 9/2018 | Yi | G09G 5/393 |

(Continued)

FOREIGN PATENT DOCUMENTS

| | | | |
|---|---|---|---|
| KR | 20150029763 | A | 3/2015 |
| KR | 20200144827 | A | 12/2020 |
| KR | 20210078252 | A | 6/2021 |

*Primary Examiner* — Richard J Hong
(74) *Attorney, Agent, or Firm* — Seed IP Law Group LLP

(57) ABSTRACT

A light emitting display apparatus includes an analyzing circuit for analyzing at least one of image change amount and current change amount by analyzing input image data, and generating a driving frequency control signal according to analysis results, a control signal generator for generating driver control signals for changing a period of outputting data voltages according to the driving frequency control signal, transmitting a gate control signal of the driver control signals to a gate driver, and transmitting data control signals of the driver control signals to a data driver, and a data aligning circuit for generating image data by rearranging the input image data transmitted from the analyzing circuit according to a structure of a light emitting display panel, and outputting the image data to the data driver.

12 Claims, 10 Drawing Sheets

(56) References Cited

U.S. PATENT DOCUMENTS

| | | | | |
|---|---|---|---|---|
| 2018/0350313 | A1* | 12/2018 | Nambi | G09G 3/36 |
| 2020/0402478 | A1* | 12/2020 | Her | G09G 3/3233 |
| 2021/0248957 | A1* | 8/2021 | Lee | G09G 3/3225 |
| 2021/0248973 | A1* | 8/2021 | Jeon | G09G 5/005 |
| 2022/0139330 | A1* | 5/2022 | Kwon | G09G 3/3233<br>345/204 |
| 2023/0028898 | A1* | 1/2023 | Xu | G09G 5/395 |

* cited by examiner

LIGHT EMITTING DISPLAY APPARATUS GENERATING VARIABLE DRIVING FREQUENCY BASED ON IMAGE AND CURRENT CHANGE AMOUNT

CROSS-REFERENCE TO RELATED APPLICATIONS

This application claims the benefit of the Korean Patent Application No. 10-2022-0187463 filed on Dec. 28, 2022, which is hereby incorporated by reference as if fully set forth herein.

BACKGROUND

Technical Field

The present disclosure relates to a light emitting display apparatus.

Description of the Related Art

Light emitting display apparatuses are mounted on electronic products such as televisions, monitors, notebook computers, smart phones, tablet computers, electronic pads, wearable devices, watch phones, portable information devices, navigation devices, or vehicle control display apparatus to perform a function of displaying images.

Light emitting display panels self-emit light to display an image.

BRIEF SUMMARY

Because a light emitting display apparatus self-emit light, it often has high power consumption. Particularly, among the power consumption of the light emitting display apparatus, the power consumption of the data driver occupies a high proportion.

It was realized after a study that the power consumption of the data driver differs depending on the driving frequency, and particularly, it was determined that the power consumption of the data driver at a high driving frequency is greater than that of the data driver at a low driving frequency. Accordingly, the inventors of the present disclosure have invented a light emitting display apparatus capable of selectively reducing power consumption by lowering the driving frequency according to the analysis result of the input image data.

Accordingly, the present disclosure is directed to providing a light emitting display apparatus that substantially obviates one or more problems due to limitations and disadvantages of the related art.

An aspect of the present disclosure is directed to providing a light emitting display apparatus changing a driving frequency according to an analysis result of input image data.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a light emitting display apparatus including an analyzing circuit for analyzing at least one of image change amount and current change amount by analyzing input image data, and generating a driving frequency control signal according to analysis results, a control signal generator for generating driver control signals for changing a period of outputting data voltages according to the driving frequency control signal, transmitting a gate control signal of the driver control signals to a gate driver, and transmitting data control signals of the driver control signals to a data driver, and a data aligning circuit for generating image data by rearranging the input image data transmitted from the analyzing circuit according to a structure of a light emitting display panel, and outputting the image data to the data driver.

It is to be understood that both the foregoing general description and the following detailed description of the present disclosure are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
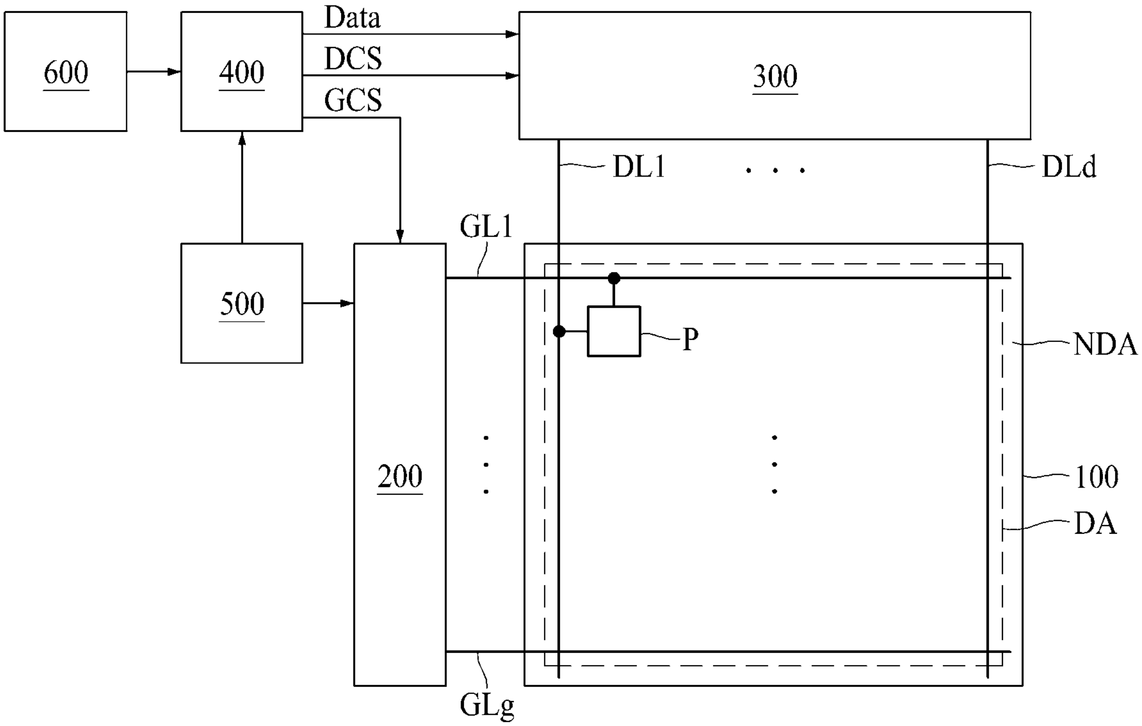
FIG. 1 is an exemplary diagram illustrating a configuration of a light emitting display apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc., may be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

Figure 2:
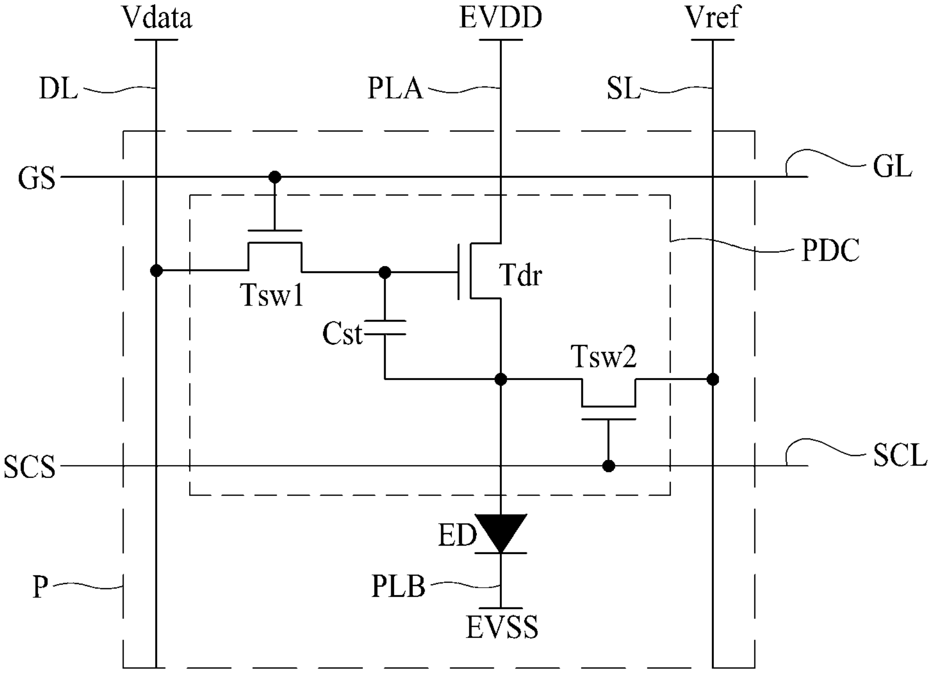
FIG. 2 is an exemplary diagram illustrating a structure of a pixel of a light emitting display apparatus according to an embodiment of the present disclosure.
Figure 3:
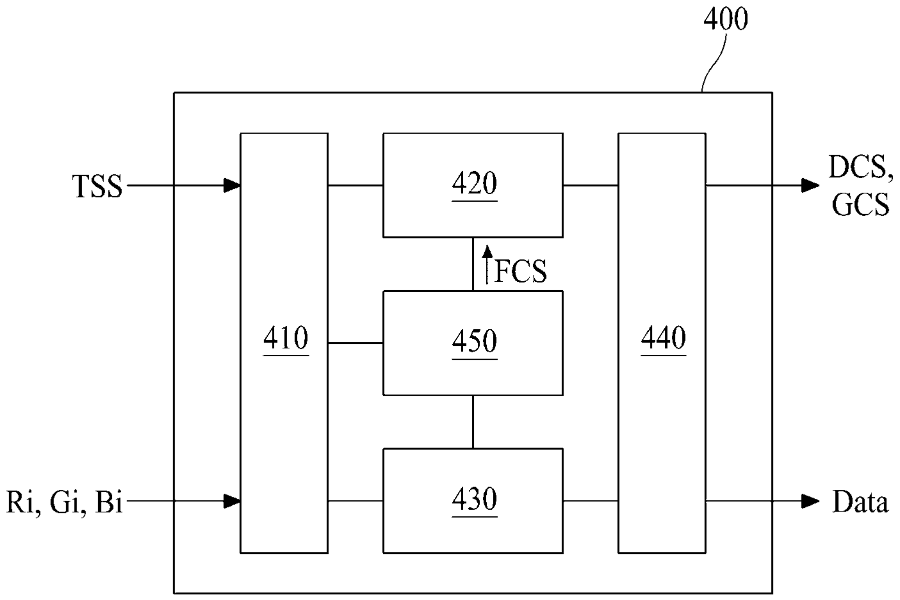
FIG. 3 is an exemplary diagram illustrating a structure of a control driver useful in a display apparatus according to an embodiment of the present disclosure.
Figure 4:
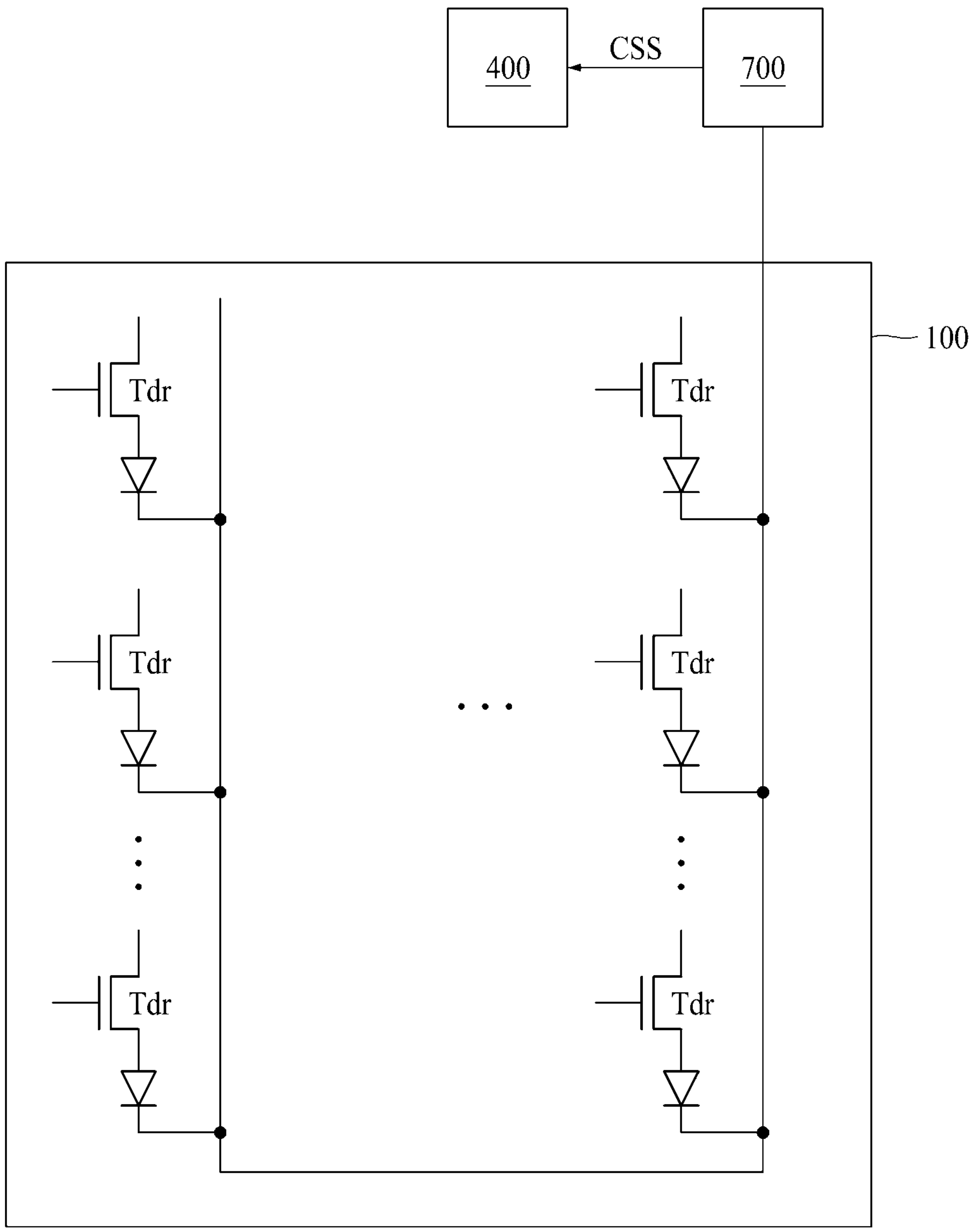
FIG. 4 is an exemplary diagram illustrating a current change amount sensing circuit applied to a light emitting display apparatus according to an embodiment of the present disclosure.
Figure 5:
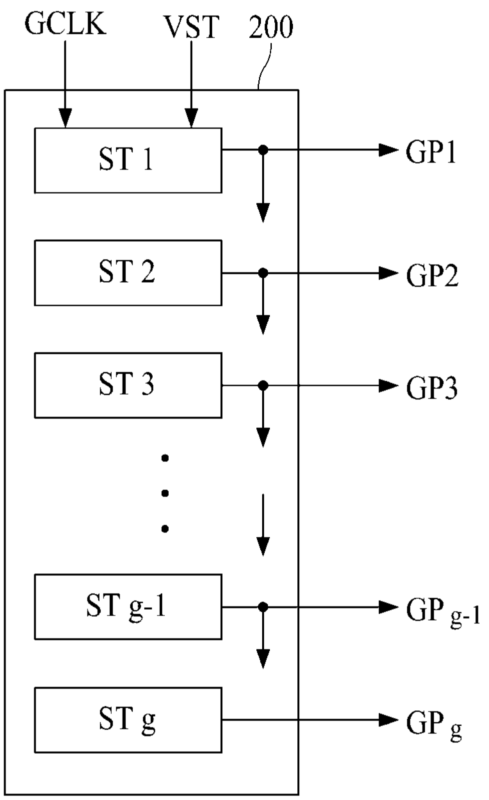
FIG. 5 is an exemplary diagram illustrating a structure of a gate driver useful in a display apparatus according to an embodiment of the present disclosure.
Figure 6:
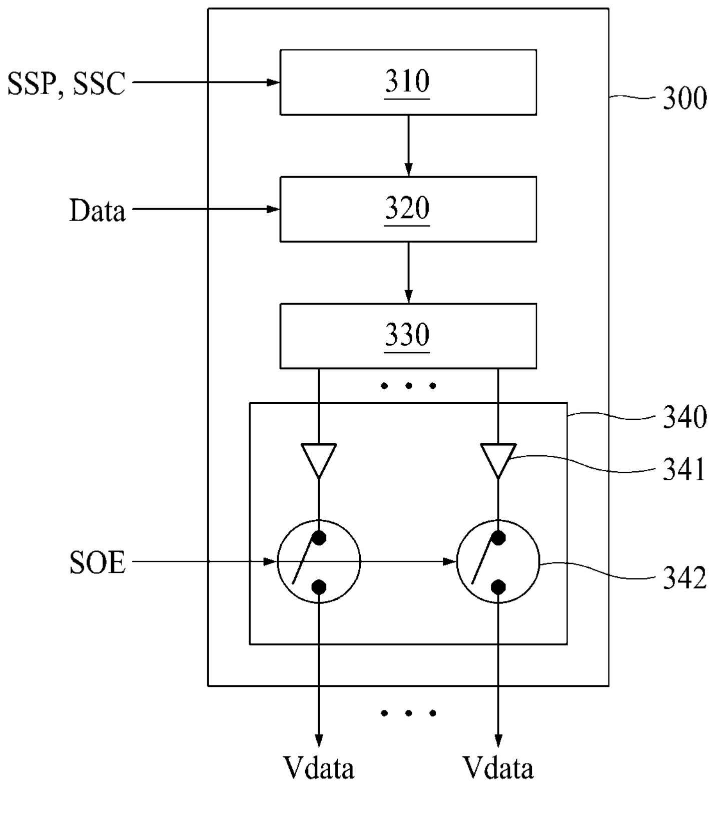
FIG. 6 is an exemplary diagram illustrating a structure of a data driver useful in a display apparatus according to an embodiment of the present disclosure.

FIG. 1 is an exemplary diagram illustrating a configuration of a light emitting display apparatus according to an embodiment of the present disclosure, FIG. 2 is an exemplary diagram illustrating a structure of a pixel applied to a light emitting display apparatus according to an embodiment of the present disclosure, FIG. 3 is an exemplary diagram illustrating a structure of a control driver applied to a display apparatus according to an embodiment of the present disclosure, FIG. 4 is an exemplary diagram illustrating a current change amount sensing circuit applied to a light emitting display apparatus according to an embodiment of the present disclosure, FIG. 5 is an exemplary diagram illustrating a structure of a gate driver applied to a display apparatus according to an embodiment of the present disclosure, and FIG. 6 is an exemplary diagram illustrating a structure of a data driver useful in to a display apparatus according to an embodiment of the present disclosure.

The light emitting display apparatus according to an embodiment of the present disclosure may configure various kinds of electronic devices. The electronic devices may include, for example, smartphones, tablet personal computers (PCs), televisions (TVs), and monitors.

The light emitting display apparatus according to the present disclosure, as illustrated in FIG. 1, may include a light emitting display panel 100 which includes a display area DA displaying an image and a non-display area NDA provided outside the display area DA, a gate driver 200 which supplies a gate signal to a plurality of gate lines GL1 to GLg provided in the display area DA of the light emitting display panel 100, a data driver 300 which supplies data voltages to a plurality of data lines DL1 to DLd provided in the light emitting display panel 100, a control driver 400 which controls driving of the gate driver 200 and the data driver 300, a scaler 600 which changes communication information received through a communication network into a signal recognizable by the control driver 400, and a power supply 500 which supplies power to the control driver, the gate driver, the data driver, and the light emitting display panel 100.

First, the light emitting display panel 100 may include the display area DA and the non-display area NDA. The gate lines GL1 to GLg, the data lines DL1 to DLd, and the pixels P may be provided in the display area DA. Accordingly, the display area DA may display an image. Here, g and d may each be a natural number. The non-display area NDA may surround the display area DA.

The pixel P included in the display panel 100, as illustrated in FIG. 2, may include a pixel driving circuit PDC which includes a switching transistor Tsw1, a storage capacitor Cst, a driving transistor Tdr, and a sensing transistor Tsw2, and a light emitting device ED connected to the pixel driving circuit PDC.

A first terminal of the driving transistor Tdr may be connected to a first voltage supply line PLA through which a first voltage EVDD is supplied, and a second terminal of the driving transistor Tdr may be connected to the light emitting device ED.

A first terminal of the switching transistor Tsw1 may be connected to the data line DL, a second terminal of the switching transistor Tsw1 may be connected to a gate of the driving transistor Tdr, and a gate of the switching transistor Tsw1 may be connected to a gate line GL.

A data voltage Vdata may be supplied to a data line DL from the data driver 300. A gate signal GS may be supplied to the gate line GL from the gate driver 200. The gate signal GS may include a gate pulse GP for turning on the switching transistor Tsw1 and a gate-off signal for turning off the switching transistor Tsw1.

The sensing transistor Tsw2 may be provided for measuring a threshold voltage or mobility of the driving transistor. A first terminal of the sensing transistor Tsw2 may be connected to a second terminal of the driving transistor Tdr and the light emitting device ED, a second terminal of the sensing transistor Tsw2 may be connected to a sensing line SL through which a reference voltage Vref is supplied, and a gate of the sensing transistor Tsw2 may be connected to a sensing control line SCL through which a sensing control signal SCS is supplied.

The sensing line SL may be connected to the data driver 300 and may be connected to the power supply 500 through the data driver 300. That is, the reference voltage Vref supplied from the power supply 500 may be supplied to the pixels through the sensing line SL, and sensing signals transferred from the pixels may be processed by the data driver 300.

The light emitting device ED includes a first electrode that receives a first voltage EVDD through the driving transistor Tdr, a second electrode connected to a second voltage supply line PLB that supplies a second voltage EVSS, and a light emitting layer provided between the first electrode and the second electrode.

The structure of the pixel P useful in to the present disclosure is not limited to the structure illustrated in FIG. 2. Accordingly, a structure of the pixel P may be changed to various shapes.

The control driver 400 may realign input image data Ri, Gi, and Bi transferred from the scaler 600 by using a timing synchronization signal transferred from the scaler 600 and may generate a data control signal DCS which is to be supplied to the data driver 300 and a gate control signal GCS which is to be supplied to the gate driver 200.

To this end, the control driver 400 may include a data aligning portion 430 which realigns input image data Ri, Gi, and Bi to generate image data Data and supplies the image data Data to the data driver 300, a control signal generator 420 which generates the gate control signal GCS and the data control signal DCS by using the timing synchronization signal TSS, an input portion 410 which receives the timing synchronization signal and the input image data Ri, Gi, and Bi transferred from the scaler 600 and respectively transfers the timing synchronization signal TSS and the input image data Ri, Gi, and Bi to the control signal generator 420 and the data aligning portion 430, and an output unit 440 which supplies the data driver 300 with the image data Data generated by the data aligning portion 430 and the data control signal DCS generated by the control signal generator 420 and supplies the gate driver 200 with the gate control signal GCS generated by the control signal generator. Each of the input portion 410 and the data aligning portion 430 include a circuit and may include a processing circuit. They may also include a programed microprocessor or a microcontroller, but this is not required. Thus, they can each be referred to as circuit as well as portion. The term portion is used in the broad sense herein to include hardware, both electrical circuits and integrated circuit structures such as transistors, diodes and other physical structures, and thus each instance herein of use of the term "portion" includes within its meaning such hardware.

The control signal generator 420 may generate a power control signal supplied to the power supply 500.

Particularly, the control driver 400 applied to the present disclosure, as illustrated in FIG. 3, may further include an analyzing portion 450.

The analyzing portion 450 may analyze at least one of image change amount and current change amount by analyzing input image data Ri, Gi, and Bi of at least two frames, and generate a driving frequency control signal FCS according to analysis results. The analyzing portion 450 includes a circuit and may include a processing circuit. It may also include a programed microprocessor or a microcontroller. Thus, they can each be referred to as circuit as well as portion.

Here, the image change amount may denote, for example, a change amount between an image output from the light emitting display panel in a first frame and an image output from the light emitting display panel in a second frame. For example, the image change amount being great may denote that the image output in the first frame and the image output in the second frame are different from each other, and the image change amount being small may denote that the image output from the first frame and the image output from the second frame are similar. In each of the first frame and the second frame, gate pulses GP may be output to all gate lines GL provided in the light emitting display panel 100.

The current change amount may denote, for example, a change amount between a current consumed in the light emitting display panel 100 when data voltages Vdata corresponding to the input image data Ri, Gi, and Bi of the first frame are outputted to the data lines DL in the light emitting display panel 100 and a current consumed in the light emitting display panel 100 when data voltages Vdata corresponding to the input image data Ri, Gi, and Bi of the second frame are output to the data lines DL in the light emitting display panel 100.

The current change amount may be related to luminance of light output from the pixel, and the luminance of light may be related to a gray (or grayscale) of an input image data corresponding to a pixel. For example, the current change amount being great may denote that a sum of grays (or grayscales) of input image data Ri, Gi, and Bi of the first frame and a sum of grays (or grays) of input image data Ri, Gi, and Bi of the second frame are different from each other, which may denote that an image of the first frame and an image of the second frame are different from each other. The current change amount being small may denote that a sum of grays (or grayscales) of input image data Ri, Gi, and Bi of the first frame and a sum of grays (or grays) of input image data Ri, Gi, and Bi of the second frame are similar, which may denote that an image of the first frame and an image of the second frame are similar.

However, the current change amount may be measured by sensing the current actually generated in the light emitting display panel 100.

To this end, a light emitting display apparatus according to the present disclosure may further include a current sensing portion 700 connected to the second electrode of the light emitting devices ED, as illustrated in FIG. 4. The current sensing portion 700 senses the current transmitted from the light emitting devices ED in each of the first frame and the second frame to generate a current sensing signal CSS, and may transmit the current sensing signal CSS to the control driver 400. The current sensing portion includes a circuit and thus can be referred to as circuit as well as portion.

The analyzing portion 450 of the control driver 400 may analyze the current sensing signals CSS received in each of the first frame and the second frame to analyze the current change amount.

That is, the analyzing portion 450 may analyze the current change amount by analyzing the input image data Ri, Gi, and Bi, or may analyze the current change amount by using the current actually generated in the light emitting display panel 100.

The control signal generator 420 may generate a gate control signal GCS and a data control signal DCS. Particularly, the control signal generator 420 may generate driver control signals, which can change a period at which data voltages Vdata are output, according to a driving frequency control signal FCS generated in the analyzing portion 450. The control signal generator 420 may transmit gate control signals GCS among the driver control signals to the gate driver 200, and data control signals DCS among the driver control signals to the data driver 300. That is, the driver control signals may include gate control signals GCS and data control signals DCS.

The data aligning portion 430 may rearrange the input image data Ri, Gi, and Bi transmitted from the analyzing portion 450 or the input portion 410 based on a structure of the light emitting display panel 100, and may supply image data Data to the data driver 300.

Moreover, the control driver 400 may further include a storage portion for storing various information. The storage portion may be included in the control driver 400, particularly, in the analyzing portion 450, or may be separated from the control driver 400 and provided independently of the control driver 400. Input image data Ri, Gi, and Bi may be stored in the storage portion. The analyzing portion 450 may compare the input image data Ri, Gi, and Bi stored in the storage portion to analyze the image change amount.

The scaler 600 performs a function of driving the control driver 400 and an electronic device. For example, when the electronic device is a television (TV), the scaler 600 may receive various sound information, image information, and letter information over a communication network, and may transfer the received image information to the control driver 400. That is, the scaler 600 may change the image information received over the communication network into a signal recognized by the control driver 400. In this case, the signals recognized by the control driver 400 may be the input image data Ri, Gi, and Bi. That is, the scaler 600 may convert the image information into the input image data Ri, Gi, and Bi, and the input image data Ri, Gi, Bi may be transferred to the control driver 400.

However, the scaler 600 may be provided with an analyzing portion 450 included in the control driver 400. That is, in the light emitting display apparatus according to the present disclosure, the analyzing portion 450 may be included in the control driver 400 or may be included in the scaler 600.

When the analyzing portion 450 is included in the scaler 600, the analyzing portion 450 may compare input image data Ri, Gi, and Bi generated in the scaler 600 to analyze at least one of the image change amount and the current change amount, and may generate a driving frequency control signal FCS based on analysis results.

In this case, the input image data Ri, Gi, and Bi generated in the scaler 600 may be transferred to the data aligning portion 430 of the control driver 400, and the driving frequency control signal FCS generated in the scaler 600 may be transferred to the control signal generator 420. The control signal generator 420 may generate driver control signals based on the driving frequency control signal FCS.

When the analyzing portion 450 is included in the scaler 600, a light emitting display apparatus according to the present disclosure may further include the scaler 600.

The power supply 500 may generate various powers and may supply the generated powers to the control driver 400, the gate driver 200, the data driver 300, and the light emitting display panel 100.

The gate driver 200 may be directly embedded into the non-display area NDA by using a gate-in panel (GIP) type, or may be provided in the display area DA in which light emitting devices ED are provided, or may be provided on a chip-on film mounted in the non-display area NDA.

The gate driver 200 may supply gate pulses GP1 to GPg to the gate lines GL1 to GLg.

When a gate pulse GP generated by the gate driver 200 is supplied to a gate of a switching transistor Tsw1 included in the pixel P, the switching transistor Tsw1 may be turned on. When the switching transistor Tsw1 is turned on, data voltage Vdata supplied through a data line DL may be supplied to a pixel.

When a gate-off signal generated by the gate driver 200 is supplied to a gate of a switching transistor Tsw1, the switching transistor Tsw1 may be turned off. When the switching transistor Tsw1 is turned off, a data voltage Vdata may not be supplied to the pixel P any longer.

The gate signal GS supplied to the gate line GL may include the gate pulse GP and the gate-off signal.

To supply gate pulses GP1 to GPg to gate lines GL1 to GLg, the gate driver 200, as illustrated in FIG. 5, may include stages ST1 to STg connected to gate lines GL1 to GLg.

Each of the stages ST1 to STg may be connected to one gate line GL, but may also be connected to at least two gate lines GL.

In order to generate gate pulses GP1 to GPg, a gate start signal VST and at least one gate clock GCLK generated by the control signal generator 420 may be transferred to the gate driver 200. That is, the gate start signal VST and the at least one gate clock GCLK may be included in the gate control signals GCS.

One of the stages ST1 to STg may be driven by a gate start signal VST to output a gate pulse GP to a gate line GL. The gate pulse GP may be generated by the gate clock GCLK.

That is, the gate start signal VST may be a signal indicating a start of each of the first and second frames, and thus, a length of a period (hereinafter simply referred to as a display period) during which an image is displayed in each of the first and second frames and a period (hereinafter simply referred to as a blank period) during which an image is not displayed may be determined.

Moreover, because the gate clock GCLK corresponds to one gate pulse GP, a length of the display period and a length of the blank period may be determined by a width of the gate clock GCLK and an interval between the gate clocks GCLK.

That is, the length of the display period and the length of the blank period may be determined by the gate start signal VST and at least one gate clock GCLK.

At least one of signals output from a stage ST where a gate pulse is output may be supplied to another stage ST to drive another stage ST. Accordingly, a gate pulse may be output in another stage ST.

That is, the stages ST may be driven sequentially, and thus, the gate pulses GP may be sequentially supplied to the gate lines GL.

One of various kinds of gate drivers which are being currently used may be applied to a light emitting display apparatus according to the present disclosure. Moreover, a structure and function of the gate driver 200 may not be a feature of the present disclosure, and thus, detailed descriptions of a detailed structure and function of the stage ST are omitted.

Finally, the data driver 300 may supply data voltages Vdata to the data lines DL1 to DLd.

To this end, the data driver 300, as illustrated in FIG. 6, may include a shift register 310 which outputs a sampling signal, a latch 320 which latches image data Data received from the control driver 400, a digital-to-analog converter 330 which converts the image data Data, transferred from the latch 320, into a data voltage Vdata and outputs the data voltage Vdata, and an output buffer 340 which outputs the data voltage, transferred from the digital-to-analog converter 330, to the data line DL on the basis of a source output enable signal SOE.

The shift register 310 may output the sampling signal by using the data control signals DCS received from the control signal generator 420. For example, the data control signals DCS transferred to the shift register 310 may include a source start pulse SSP and a source shift clock signal SSC. The source start pulse SSP may be a signal indicating a start of each of the first frame and the second frame. The source shift clock signal SSC may be a signal which determines a timing at which image data are stored in the latch 320 or a timing at which image data are output from the latch 320. The sampling signal may be generated by the source start pulse SSP and the source shift clock signal SSC.

Particularly, the source start pulse SSP may be a signal indicating a start of each of the first and second frames, and thus, the length of the display period and the length of the blank period of each of the first and second frames may be determined.

The latch 320 may latch image data Data sequentially received from the control driver 400, and then output the image data Data to the digital-to-analog converter 330 at the same time according to the sampling signal.

The digital-to-analog converter 330 may simultaneously convert the image data Data transferred from the latch 320 into data voltages Vdata and output the data voltages Vdata.

The output buffer 340 may simultaneously output the data voltages Vdata transferred from the digital-to-analog converter 330 to data lines DL1 to DLd of the display panel on the basis of the source output enable signal SOE transferred from the control signal generator 420.

To this end, the output buffer 340 may include a buffer 341 which stores the data voltage Vdata transferred from the digital-to-analog converter 330 and a switch 342 which outputs the data voltage Vdata stored in the buffer 341 to the data line DL on the basis of the source output enable signal SOE.

That is, the output buffer 340 may include switches 342 and buffers 341 corresponding to the data lines DL1 to DLd. The buffers 341 and the switches 342 may be connected in one-to-one relationship.

To provide an additional description, when the switches 342 are turned on based on the source output enable signal SOE simultaneously supplied to the switches 342, the data voltages Vdata stored in the buffers 341 may be supplied to the data lines DL1 to DLd through the switches 342.

The data voltages Vdata supplied to the data lines DL1 to DLd may be supplied to pixels P connected to a gate line GL supplied with a gate pulse GP.

Therefore, a timing at which the data voltages Vdata are output to the data lines DL1 to DLd may be determined by the source output enable signal SOE.

That is, the timing when the data voltages Vdata are output to the data lines DL may be determined on the basis of the source output enable signal SOE, and thus the display period and the length of the blank period of each of the first and second frames may be determined.

A structure and function of the gate driver 200 may not be a feature of the present disclosure, and thus, detailed descriptions of a detailed structure and function of the stage ST are omitted.

Figure 7:
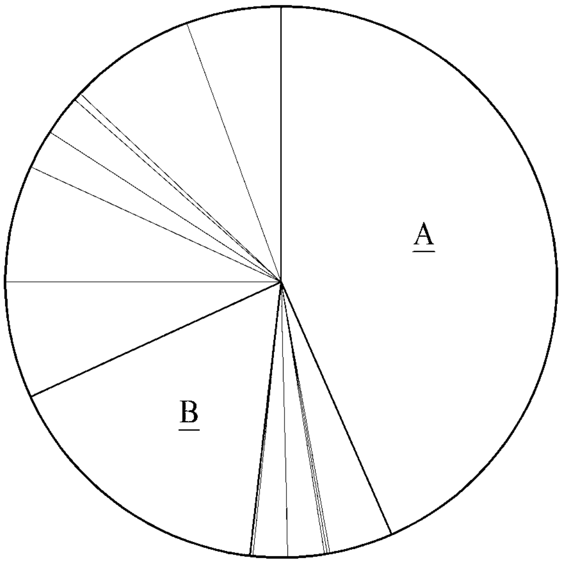
FIG. 7 is an exemplary diagram illustrating a power consumption ratio of a light emitting display apparatus according to an embodiment of the present disclosure.
Figure 8:
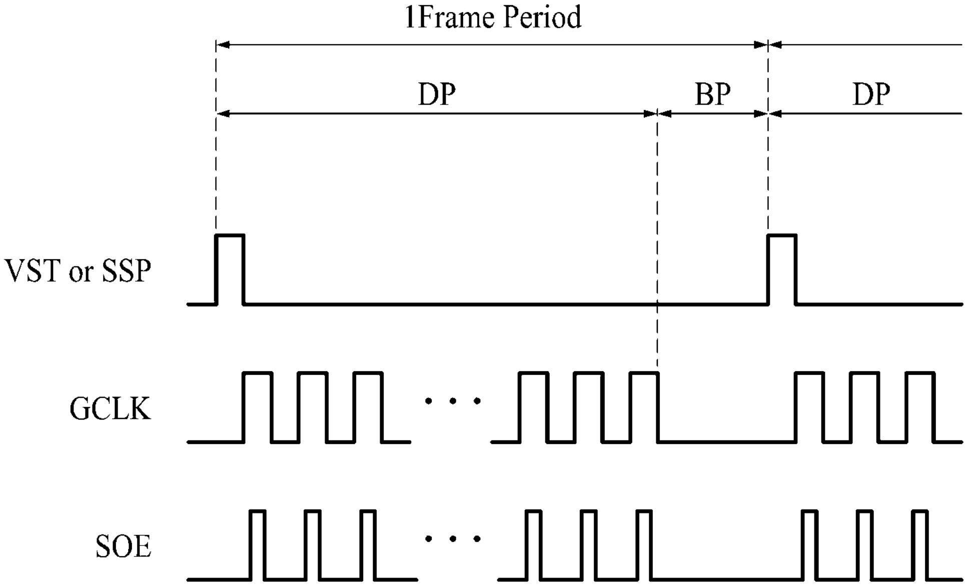
FIG. 8 is an exemplary diagram illustrating driver control signals useful in the light emitting display apparatus according to an embodiment of the present disclosure.

FIG. 7 is an exemplary diagram illustrating a power consumption ratio of a light emitting display apparatus according to an embodiment of the present disclosure, and FIG. 8 is an exemplary diagram illustrating driver control signals applied to the light emitting display apparatus according to an embodiment of the present disclosure.

As illustrated in FIG. 7, a power consumption A of a light emitting display panel 100 occupies the first largest portion of power consumption of the light emitting display apparatus, and a power consumption B of a data driver 300 occupies the second largest portion of power consumption of the light emitting display apparatus. Also, a power consumption of each of other components in the light emitting display apparatus is less than the power consumption B of the data driver 300.

For example, the power consumption A of the light emitting display panel 100 may be generated by a first voltage EVDD and a second voltage EVSS applied to the light emitting display panel 100.

For example, the power consumption B of the data driver 300 may be generated by a digital-to-analog converter 330 for converting image data Data into data voltages Vdata.

The power consumption A of the light emitting display panel 100 and the power consumption B of the data driver 300 occupy large parts of the entire power consumption. Thus, if the power consumption A of the light emitting display panel 100 and the power consumption B of the data driver 300 are reduced, it is possible to reduce the power consumption of the light emitting display apparatus.

The inventor of the present disclosure has confirmed that the power consumption B of the data driver 300 may be changed according to the driving frequency of the light emitting display apparatus through various tests and simulations.

For example, the inventor of the present disclosure has confirmed that the power consumption B of the data driver 300 when the light emitting display apparatus is driven at 120 Hz is less than the power consumption B of the data driver 300 when the light emitting display apparatus is driven at 240 Hz, and the power consumption B of the data driver 300 when the light emitting display apparatus is driven at 60 Hz is less than the power consumption B of the data driver 300 when the light emitting display apparatus is driven at 120 Hz. That is, when a period of converting the image data Data to the data voltage Vdata becomes shorter according to the increase in the driving frequency of the light emitting display apparatus, the power consumption B of the data driver 300 may be increased. Meanwhile, when a period of converting the image data Data to the data voltage Vdata becomes longer according to the decrease in the driving frequency of the light emitting display apparatus, the power consumption B of the data driver 300 may be decreased.

The driving of the light emitting display apparatus at the driving frequency of 120 Hz indicates that 120 frames are generated per second, and the generated 120 frames are output. The driving of the light emitting display apparatus at the driving frequency of 240 Hz indicates that 240 frames are generated per second, and the generated 240 frames are output.

Therefore, when the driving frequency is changed, the number of images outputted per second is changed, and the change of the number of images outputted per second means that the period in which the data voltages are outputted is changed.

The change of period in which the data voltages are output may mean that a length of a display period DP in which the image is outputted by the data voltages is changed or may mean that a length of a blank period BP provided between the display periods DP is changed.

First, for example, as illustrated in FIG. 8, the display period DP may be started by a gate start signal VST or a source start pulse SSP, the period of gate start signal VST or source start pulse SSP may correspond to 1 frame period, and the 1 frame period may be divided into the display period DP and the blank period BP.

The 1 frame period refers to a length of each of first frame and second frame.

In this case, as described with reference to FIG. 6, when the period of source output enable signal SOE is shortened, the interval at which the data voltages Vdata corresponding to the different gate lines are output decreases, whereby the display period DP in which the data voltages Vdata are output may be shortened. On the contrary, if the period of source output enable signal SOE is increased, the interval at which the data voltages Vdata corresponding to the different gate lines are outputted increases, whereby the display period DP in which the data voltages Vdata are outputted may be increased.

As described above, changing the length of the display period DP in which the image is outputted by the data voltages may mean that the period in which the data voltages are output is changed.

When the blank period BP is constant, as described above, if the length of the display period DP becomes long or short, the length of the 1 frame period is increased or decreased. If the length of the 1 frame period is increased, the number of images outputted per second is reduced, that is, it means that the driving frequency is reduced. When the length of the 1 frame period is decreased, the number of images outputted per second is increased, that is, it means that the driving frequency is increased.

That is, the driving frequency may be changed by changing the length of the display period DP. As described above, in order to change the display period DP, the period of the source output enable signal SOE may be changed. The source output enable signal SOE is included in a data control signal DCS, and the period of the source output enable signal SOE is determined in a control signal generator 420 by a driving frequency control signal FCS. Therefore, the driving frequency may be changed by the change of the data control signal DCS.

In the above-described example, when the length of the display period DP is changed by changing the width or period of the source output enable signal SOE, a width or period of a gate pulse may also be changed. The gate pulse GP is included in a gate control signal GCS, and the width or of the gate pulse is determined in the control signal generator 420 by the driving frequency control signal FCS. Therefore, the driving frequency may be changed by the gate control signal GCS.

Second, for example, under the condition of the same length of the display period DP, when the period of gate start signal VST or source start pulse SSP is shortened, the length of the blank period BP is shortened. Meanwhile, when the period of gate start signal VST or source start pulse SSP is increased, the length of the blank period BP is increased.

As described above, the change in the length of the blank period BP means that the period in which the data voltages are output is changed.

Under the condition that the display period DP is constant, if the length of the blank period BP is increased or decreased, the length of 1 frame period is increased or decreased. The increase in the length of 1 frame period means that the driving frequency is decreased, and the decrease in the length of 1 frame period means that the driving frequency is increased.

That is, the driving frequency may be changed by changing the length of the blank period BP, and the period of the source start pulse SSP may be changed to change the length of the blank period BP, as described above. The source start pulse SSP is included in the data control signal DCS, and the period of the source start pulse SSP is determined in the control signal generator 420 by the driving frequency control signal FCS. Therefore, the driving frequency may be changed by the data control signal DCS.

In the above-described example, when the length of the blank period BP is changed by changing the period of the source start pulse SSP, the period of the gate start signal VST may also be changed. The gate start signal VST is included in the gate control signal GCS, and the period of the gate start signal VST is determined in the control signal generator 420 by the driving frequency control signal FCS. Therefore, the driving frequency may be changed by the gate control signal GCS.

In addition, in case of the light emitting display apparatus according to the present disclosure, the driving frequency control signal FCS may be generated according to at least one of image change amount and current change amount, and the driver control signals capable of changing the period in which the data voltages Vdata are outputted may be generated according to the driving frequency control signal FCS.

That is, the data driver 300 may change the output timing at which the data voltages Vdata are output to the data lines DL according to the data control signals DCS, and the gate driver 200 may change the output timing at which the gate pulses GP are output to the gate lines GL according to the gate control signals GCS.

According to the driver control signals, when the length of the display period DP is changed or the length of the blank period DP is changed, the length of 1 frame period is changed. If the length of 1 frame period is changed, the number of images outputted per second is changed, that is, it means that the driving frequency is changed.

That is, in the light emitting display apparatus according to the present disclosure, the driving frequency may be changed according to at least one of the image change amount and current change amount. In particular, the power consumption of the light emitting display apparatus may be reduced by reducing the driving frequency.

Hereinafter, a method for driving the light emitting display apparatus according to an embodiment of the present disclosure is described with reference to FIGS. 1 to 11B.

Figure 9A:
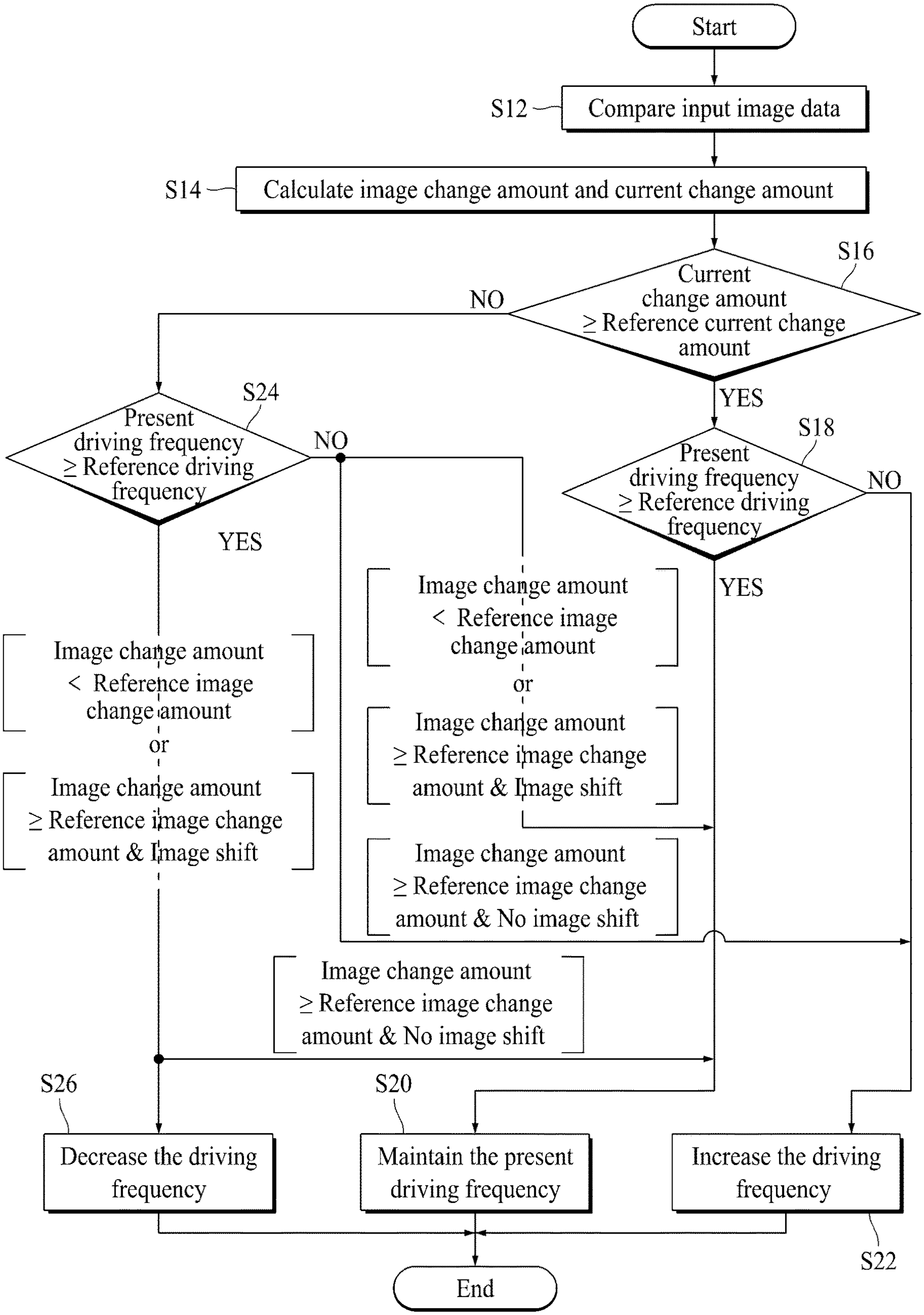
FIG. 9A is an flow chart illustrating a driving method of the light emitting display apparatus according to an embodiment of the present disclosure.
Figure 9B:
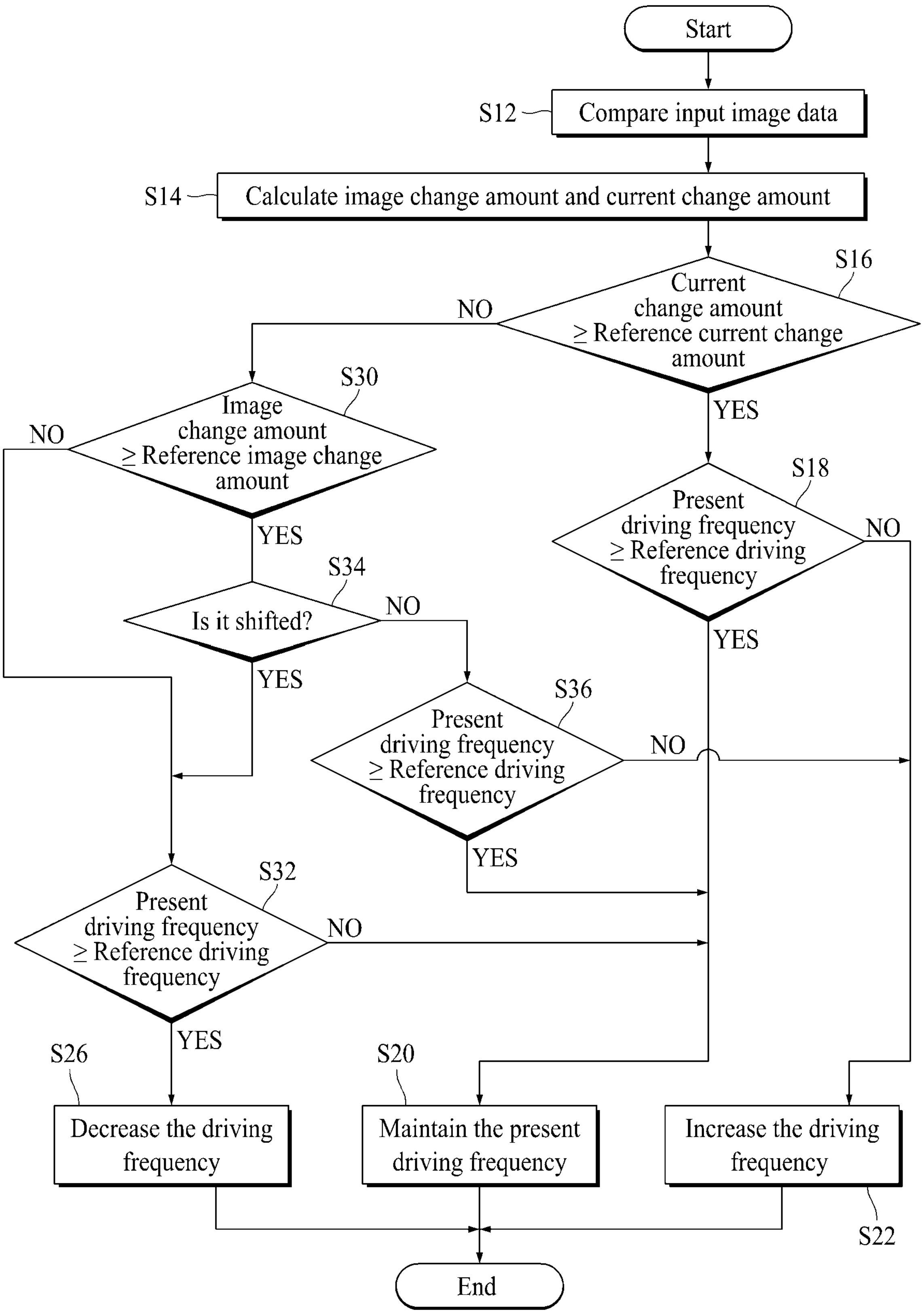
FIG. 9B is another exemplary flow chart illustrating a driving method of the light emitting display apparatus according to an embodiment of the present disclosure.
Figure 10:
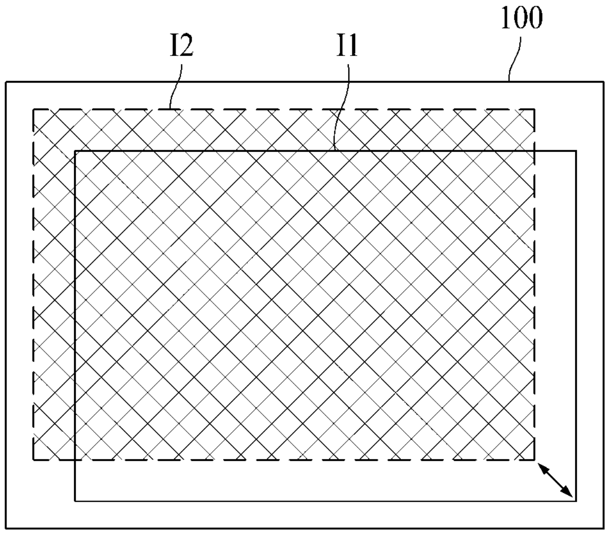
FIG. 10 is an exemplary diagram illustrating a method of shifting images in the light emitting display apparatus according to an embodiment of the present disclosure.
Figure 11A:
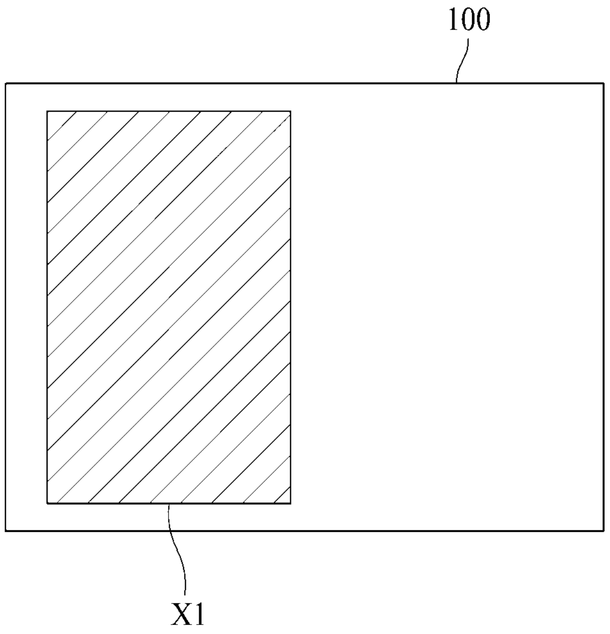
FIGS. 11A and 11B are exemplary diagrams illustrating a method of alternately outputting the same images at opposite positions in the light emitting display apparatus according to an embodiment of the present disclosure.
Figure 11B:
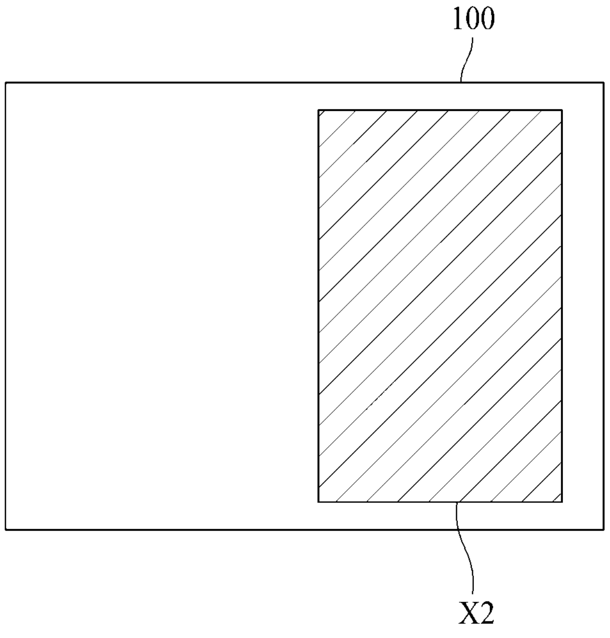

FIG. 9A is an exemplary diagram illustrating a driving method of the light emitting display apparatus according to an embodiment of the present disclosure, FIG. 9B is another exemplary diagram illustrating a driving method of the light emitting display apparatus according to an embodiment of the present disclosure, FIG. 10 is an exemplary diagram illustrating a method of shifting images in the light emitting display apparatus according to an embodiment of the present disclosure, and FIGS. 11A and 11B are exemplary diagrams illustrating a method of alternately outputting the same images at opposite positions in the light emitting display apparatus according to an embodiment of the present disclosure. In the following description, contents identical or similar to those described with reference to FIGS. 1 to 8 are omitted or briefly described.

Hereinafter, a method of driving the light emitting display apparatus according to an embodiment of the present disclosure will be described with reference to FIG. 9A, and then a method of driving the light emitting display apparatus according to an embodiment of the present disclosure will be described with reference to FIG. 9B. In this case, in the driving method described with reference to FIG. 9A, a current change amount and a present driving frequency are used as a determination criterion. In the driving method described with reference to FIG. 9B, a current change amount, an image change amount, and a present driving frequency are used as a determination criterion. That is, even in the driving method described with reference to FIG. 9A, the image change amount is used as a determination criterion. However, in case of the driving method described with reference to FIG. 9B, a classification according to the image change amount is further included. Therefore, FIGS. 9A and 9B illustrate one driving method. However, the driving method may be differently illustrated by the different determination criteria in FIGS. 9A and 9B, respectively.

First, a method for driving the light emitting display apparatus according to an embodiment of the present disclosure will be described with reference to FIG. 9A.

First, an analyzing portion 450 compares input image data Ri, Gi, and Bi of a first frame with input image data Ri, Gi, and Bi of a second frame (S12).

In this case, the analyzing portion 450 may be included in a control driver 400 or may be included in a scaler 600.

Next, the analyzing portion 450 calculates at least one of the image change amount and the current change amount by using the input image data Ri, Gi, and Bi (S14).

In this case, the image change amount may be generated by comparing the input image data Ri, Gi, and Bi. The current change amount may be generated by comparing the input image data Ri, Gi, and Bi, or may be generated by using a current sensing signal CSS transmitted from a current sensing portion 700.

Next, the analyzing portion 450 determines whether the current change amount generated by comparing the input image data Ri, Gi, and Bi is greater than or equal to a reference current change amount (S16). Herein, the reference current change amount means a current change amount which needs to change the driving frequency to a high frequency.

Then, based on determination results (S16), if the current change amount is greater than or equal to the reference current change amount, the analyzing portion 450 determines whether the present driving frequency is greater than or equal to a preset reference driving frequency (S18). Herein, the reference driving frequency may be at least one of high frequencies used as the driving frequency.

Then, based on determination results (S16 and S18), if the current change amount is greater than or equal to the reference current change amount and the present driving frequency is greater than or equal to the preset reference driving frequency, the analyzing portion 450 generates the driving frequency control signal FCS for maintaining the present driving frequency and transmits the driving frequency control signal FCS to the control signal generator 420 (S20).

That is, the current change amount which is greater than or equal to the reference current change amount means that the image of the first frame is different from the image of the second frame. Therefore, the light emitting display apparatus needs to be driven at a high frequency.

In this case, the present driving frequency which is greater than or equal to the reference driving frequency means that the light emitting display apparatus is driven at a high frequency.

This means that the light emitting display apparatus is already driven at a high frequency in the condition in which the light emitting display apparatus should be driven at a high frequency. Therefore, the analyzing portion 450 may transmit the driving frequency control signal FCS for maintaining the present driving frequency to the control signal generator 420.

The control signal generator 420 generates the driver control signals GCS and DCS so as to continuously maintain the present driving frequency and transmits the driver control signals GCS and DCS to the gate driver 200 and the data driver 300. Accordingly, the light emitting display apparatus may be continuously driven at the present driving frequency (high frequency).

Then, based on determination results (S16 and S18), if the current change amount is greater than or equal to the reference current change amount and the present driving frequency is smaller than the reference driving frequency, the analyzing portion 450 generates the driving frequency control signal FCS for increasing the driving frequency and transmits the driving frequency control signal FCS to the control signal generator 420 (S22).

That is, the current change amount which is greater than or equal to the reference current change amount means that the image of the first frame is different from the image of the second frame. Therefore, the light emitting display apparatus needs to be driven at a high frequency.

In this case, the present driving frequency which is smaller than the reference driving frequency means that the light emitting display apparatus is driven at a low frequency.

This means that the light emitting display apparatus is driven at a low frequency in the condition in which the light emitting display apparatus should be driven at a high frequency. Therefore, the analyzing portion 450 may transmit the driving frequency control signal FCS for increasing the driving frequency to the control signal generator 420.

The control signal generator 420 generates the driver control signals GCS and DCS so as to drive the light emitting display at a driving frequency higher than the present driving frequency, and transmits the driver control signals GCS and DCS to the gate driver 200 and the data driver 300. Accordingly, the display period DP may be reduced or the blank period BP may be reduced.

Then, based on determination results (S16), if the current change amount is smaller than the reference current change amount, the analyzing portion 450 determines whether the present driving frequency is greater than or equal to the reference driving frequency (S24).

Then, based on determination results (S16 and S24), if the current change amount is smaller than the reference current change amount, the present driving frequency is smaller than the reference driving frequency, and the image change amount is smaller than the preset reference image change amount, the analyzing portion 450 generates the driving frequency control signal FCS for maintaining the present driving frequency, and transmits the driving frequency control signal FCS to the control signal generator 420 (S20).

That is, the current change amount which is smaller than the reference current change amount and the image change amount which is smaller than the reference image change amount means that the image of the first frame is similar to the image of the second frame. Therefore, the light emitting display apparatus needs to be driven at a low frequency. Herein, the reference image change amount means the image change amount which needs to change the driving frequency to a high frequency.

In this case, the present driving frequency which is smaller than the reference driving frequency means that the light emitting display apparatus is driven at a low frequency.

This means that the light emitting display apparatus is already driven at a low frequency in the condition in which the light emitting display apparatus should be driven at a low frequency. Therefore, the analyzing portion 450 may transmit the driving frequency control signal FCS for maintaining the present driving frequency to the control signal generator 420.

The control signal generator 420 generates the driver control signals GCS and DCS so that the presently used driving frequency may be continuously maintained, and transmits the driver control signals GCS and DCS to the gate driver 200 and the data driver 300. Accordingly, the light emitting display apparatus may be continuously driven at the present driving frequency (low frequency).

Then, based on determination results (S16 and S24), if it is determined that the current change amount is smaller than the reference current change amount, the present driving frequency is smaller than the reference driving frequency, and the image change amount is greater than or equal to the reference image change amount, and it is determined that the output position of the image is repeatedly shifted in the light emitting display panel, the analyzing portion 450 generates the driving frequency control signal FCS for maintaining the present driving frequency and transmits the driving frequency control signal FCS to the control signal generator 420 (S20).

That is, the current change amount which is smaller than the reference current change amount means that the image of the first frame and the image of the second frame are similar, whereby the light emitting display apparatus needs to be driven at a low frequency.

In this case, that the present driving frequency which is smaller than the reference driving frequency means that the light emitting display apparatus is driven at a low frequency.

This means that the light emitting display apparatus is already driven at a low frequency in the condition in which the light emitting display apparatus should be driven at a low frequency.

However, the image change amount which is greater than or equal to the reference image change amount means that the light emitting display apparatus needs to be driven at a high frequency due to the large change in the image.

Accordingly, the current change amount which is smaller than the reference current change amount may have the opposite characteristics to those of the image change amount which is greater than or equal to the reference image change amount. In this case, the analyzing portion 450 may further determine whether the output position of the image is repeatedly shifted in the light emitting display panel 100.

For example, when the image without change is output for a long time, such as still image or logo, the pixels P may be deteriorated and the quality of the light emitting display apparatus may be degraded. To prevent this problem, the control driver 400 may repeatedly shift the output positions of the same two images I1 and I2, as illustrated in FIG. 10.

In this case, the distance in which the two images I1 and I2 are shifted, that is, the moving distance, may correspond to the width of the pixel P, whereby the user does not recognize the movement of the images I1 and I2.

Therefore, when the still image or logo is output and the function of shifting the image is performed as described above, the light emitting display apparatus may be driven at a low frequency.

Therefore, when the current change amount is smaller than the reference current change amount, the present driving frequency is smaller than the reference driving frequency, the image change amount is greater than or equal to the reference image change amount, and it is determined that the output position of the image is shifted in the light emitting display panel, the analyzing portion 450 may generate the driving frequency control signal FCS for maintaining the present driving frequency and may transmit the driving frequency control signal FCS to the control signal generator 420.

In other words, since the light emitting display apparatus is already driven at a low frequency in the condition that the light emitting display apparatus should be driven at a low frequency, the control signal generator 420 generates the driver control signals GCS and DCS so as to continuously maintain the presently used driving frequency and transmits the driver control signals to the gate driver 200 and the data driver 300. Accordingly, the light emitting display apparatus may be continuously driven at the present driving frequency (low frequency).

Then, based on determination results (S16 and S24), if the current change amount is smaller than the reference current change amount, the present driving frequency is smaller than the reference driving frequency, the image change amount is greater than or equal to the reference image change amount, and it is not determined that the output position of the image is repeatedly shifted in the light emitting display panel, the analyzing portion 450 generates the driving frequency control signal FCS for increasing the present driving frequency and transmits the driving frequency control signal FCS to the control signal generator 420 (S22).

That is, the current change amount which is smaller than the reference current change amount means that the image of the first frame and the image of the second frame are similar, whereby the light emitting display apparatus needs to be driven at a low frequency.

In this case, the present driving frequency which is smaller than the reference driving frequency means that the light emitting display apparatus is driven at a low frequency.

This means that the light emitting display apparatus is already driven at a low frequency in the condition in which the light emitting display apparatus should be driven at a low frequency.

However, the image change amount which is greater than or equal to the reference image change amount means that the light emitting display apparatus needs to be driven at a high frequency due to the large change in the image.

Accordingly, the current change amount which is smaller than the reference current change amount may have the opposite characteristics to those of the image change amount which is greater than or equal to the reference image change amount. In this case, the analyzing portion 450 may further determine whether the output position of the image is repeatedly shifted in the light emitting display panel 100.

For example, when the image without change is output for a long time, such as still image or logo, the pixels P may be deteriorated and the quality of the light emitting display apparatus may be degraded. To prevent this problem, the control driver 400 may repeatedly shift the output positions of the same two images I1 and I2, as illustrated in FIG. 10.

Therefore, when the still image or logo is output, and the function for repeatedly shifting the image is performed as described above, the light emitting display apparatus may be driven at a low frequency.

However, if the current change amount is smaller than the reference current change amount, the present driving frequency is smaller than the reference driving frequency, the image change amount is greater than or equal to the reference image change amount, and it is not determined that the output position of the image is repeatedly shifted in the light emitting display panel, the same two partial images X1 and X2 may be alternately output at different positions of the light emitting display panel of the light emitting display apparatus, as illustrated in FIGS. 11A and 11B.

That is, only the position at which the partial images X1 and X2 are output is different. If the partial image X1 shown in FIG. 11A and the partial image X2 shown in FIG. 11B are substantially the same, the current change amount is smaller than the reference current change amount, and the image change amount may be greater than the reference image change amount.

However, since the image shown in FIG. 11A and the image shown in FIG. 11B are different, the light emitting display apparatus is driven at a high frequency when the images shown in FIGS. 11A and 11B are output, preferably.

Therefore, if the current change amount is smaller than the reference current change amount, the present driving frequency is smaller than the reference driving frequency, the image change amount is greater than or equal to the reference image change amount, and it is not determined that the output position of the image is repeatedly shifted in the light emitting display panel, the analyzing portion 450 may transmit the driving frequency control signal FCS for increasing the driving frequency to the control signal generator 420.

The control signal generator 420 generates the driver control signals GCS and DCS so as to drive the light emitting display apparatus at a driving frequency higher than the present driving frequency, and transmits the driver control signals GCS and DCS to the gate driver 200 and the data driver 300. Accordingly, the display period DP may be reduced or the blank period BP may be reduced.

Then, based on determination results (S16 and S24), if the current change amount is smaller than the reference current change amount, the present driving frequency is smaller than the reference driving frequency, and the image change amount is smaller than the reference image change amount, the analyzing portion 450 generates the driving frequency control signal FCS for decreasing the driving frequency and transmits the driving frequency control signal FCS to the control signal generator 420 (S26).

That is, the current change amount which is smaller than the reference current change amount and the image change amount which is smaller than the reference image change amount mean that the image of the first frame and the image of the second frame are similar, whereby the light emitting display apparatus needs to be driven at a low frequency.

In this case, the present driving frequency which is greater than or equal to the reference driving frequency means that the light emitting display apparatus is driven at a high frequency.

This means that the light emitting display apparatus is driven at a high frequency in the condition in which the light emitting display apparatus should be driven at a low frequency. Therefore, the analyzing portion 450 may transmit the driving frequency control signal FCS for reducing the driving frequency to the control signal generator 420.

The control signal generator 420 generates the driver control signals GCS and DCS so as to drive the light emitting display apparatus at a driving frequency lower than the present driving frequency, and transmits the driver control signals GCS and DCS to the gate driver 200 and the data driver 300. Accordingly, the display period DP may be increased or the blank period BP may be increased.

Then, based on determination results (S16 and S24), if it is determined that the current change amount is smaller than the reference current change amount, the present driving frequency is greater than or equal to the reference driving frequency, the image change amount is greater than or equal to the reference image change amount, and it is determined that the output position of the image is repeatedly shifted in the light emitting display panel, the analyzing portion 450 generates the driving frequency control signal FCS for decreasing the driving frequency and transmits the driving frequency control signal FCS to the control signal generator 420 (S20).

That is, the current change amount which is smaller than the reference current change amount means that the image of the first frame and the image of the second frame are similar, whereby the light emitting display apparatus needs to be driven at a low frequency.

In this case, the present driving frequency which is greater than or equal to the reference driving frequency means that the light emitting display apparatus is driven at a high frequency.

However, the image change amount which is greater than or equal to the reference image change amount means that the light emitting display apparatus needs to be driven at a high frequency due to the large change in the image.

Accordingly, the current change amount which is smaller than the reference current change amount may have the opposite characteristics to those of the image change amount which is greater than or equal to the reference image change amount. In this case, the analyzing portion 450 may further determine whether the output position of the image is repeatedly shifted in the light emitting display panel 100.

For example, as described above, when the image without change is output for a long time, such as still image or logo, the pixels P may be deteriorated and the quality of the light emitting display apparatus may be degraded. To prevent this problem, the control driver 400 may repeatedly shift the output positions of the same two images I1 and I2, as illustrated in FIG. 10.

In this case, the distance in which the two images I1 and I2 are shifted, that is, the moving distance may correspond to the width of the pixel P, whereby the user does not recognize the movement of the images I1 and I2.

Therefore, when the still image or logo is output and the function of shifting the image is performed as described above, the light emitting display apparatus may be driven at a low frequency.

Therefore, when the current change amount is smaller than the reference current change amount, the present driving frequency is greater than or equal to the reference driving frequency, the image change amount is greater than or equal to the reference image change amount, and it is determined that the output position of the image is shifted in the light emitting display panel, the analyzing portion 450 may generate the driving frequency control signal FCS for decreasing the driving frequency and may transmit the driving frequency control signal FCS to the control signal generator 420.

In other words, since the light emitting display apparatus is driven at a high frequency in the condition that the light emitting display apparatus should be driven at a low frequency, the control signal generator 420 generates the driver control signals GCS and DCS so as to drive the light emitting display apparatus at a low frequency, and transmits the driver control signals GCS and DCS to the gate driver 200 and the data driver 300. Accordingly, the light emitting display apparatus may be driven at a low frequency.

Accordingly, the display period DP may be increased or the blank period BP may be increased.

Finally, based on the determination results (S16 and S24), if the current change amount is smaller than the reference current change amount, the present driving frequency is greater than or equal to the reference driving frequency, the image change amount is greater than or equal to the reference image change amount, and it is not determined that the output position of the image is repeatedly shifted in the light emitting display panel 100, the analyzing portion 450 generates the driving frequency control signal for maintaining the present driving frequency and transmits the driving frequency control signal to the control signal generator 420 (S22).

That is, the current change amount which is smaller than the reference current change amount means that the image of the first frame and the image of the second frame are similar, whereby the light emitting display apparatus needs to be driven at a low frequency.

In this case, the present driving frequency which is greater than or equal to the reference driving frequency means that the light emitting display apparatus is driven at a high frequency.

This means that the light emitting display apparatus is driven at a high frequency in the condition in which the light emitting display apparatus should be driven at a low frequency.

However, the image change amount which is greater than or equal to the reference image change amount means that the light emitting display apparatus needs to be driven at a high frequency due to the large change in the image.

Accordingly, the current change amount which is smaller than the reference current change amount may have the opposite characteristics to those of the image change amount which is greater than or equal to the reference image change amount. In this case, the analyzing portion 450 may further determine whether the output position of the image is repeatedly shifted in the light emitting display panel 100.

For example, when the image without change is output for a long time, such as still image or logo, the pixels P may be deteriorated and the quality of the light emitting display apparatus may be degraded. To prevent this problem, the control driver 400 may repeatedly shift the output positions of the same two images I1 and I2, as illustrated in FIG. 10.

Therefore, when the still image or logo is output, and the function for repeatedly shifting the image is performed as described above, the light emitting display apparatus may be driven at a low frequency.

However, if the current change amount is smaller than the reference current change amount, the present driving frequency is smaller than the reference driving frequency, the image change amount is greater than or equal to the reference image change amount, and it is not determined that the output position of the image is repeatedly shifted in the light emitting display panel, the same two partial images X1 and X2 may be alternately output at different positions of the light emitting display panel of the light emitting display apparatus, as illustrated in FIGS. 11A and 11B.

That is, only the position at which the partial images X1 and X2 are output is different. If the partial image X1 shown in FIG. 11A and the partial image X2 shown in FIG. 11B are substantially the same, the current change amount is smaller than the reference current change amount, and the image change amount may be greater than the reference image change amount.

However, since the image shown in FIG. 11A and the image shown in FIG. 11B are different, the light emitting display apparatus is driven at a high frequency when the images shown in FIGS. 11A and 11B are output, preferably.

Therefore, if the current change amount is smaller than the reference current change amount, the present driving frequency is greater than or equal to the reference driving frequency, the image change amount is greater than or equal to the reference image change amount, and it is not determined that the output position of the image is repeatedly shifted in the light emitting display panel 100, the analyzing portion 450 may generate the driving frequency control signal FCS for maintaining the present driving frequency and transmit the driving frequency control signal FCS to the control signal generator 420.

That is, since the light emitting display apparatus is already driven at a high frequency in the condition in which the light emitting display apparatus should be driven at a high frequency, the control signal generator 420 generates the driver control signals GCS and DCS so as to maintain the presently used driving frequency, and transmits the driver control signals GCS and DCS to the gate driver 200 and the data driver 300. Accordingly, the light emitting display apparatus may be continuously driven at the present driving frequency (high frequency).

As described above, according to the present disclosure, the driving frequency of the light emitting display apparatus may be changed according to the analysis result of at least one of the image change amount and the current change amount.

Therefore, the power consumption of the light emitting display apparatus according to the present disclosure may be reduced when compared with the power consumption of a related art light emitting display apparatus continuously driven at a high frequency.

Also, in the light emitting display apparatus according to the present disclosure, the light emitting display apparatus may be driven at a high frequency if it needs to be driven at a high frequency, whereby the quality of the light emitting display apparatus may be maintained normally.

Second, a method for driving the light emitting display apparatus according to an embodiment of the present disclosure will be described with reference to FIG. 9B. In the following description, contents which are similar or identical to those described with reference to FIG. 9A are omitted or briefly described.

First, an analyzing portion 450 compares input image data Ri, Gi, and Bi of a first frame with input image data Ri, Gi, and Bi of a second frame (S12).

Then, the analyzing portion 450 calculates at least one of image change amount and current change amount by using the input image data Ri, Gi, and Bi (S14).

Next, the analyzing portion 450 determines whether the current change amount generated by the comparison of the input image data Ri, Gi, and Bi is greater than or equal to a reference current change amount (S16).

Then, based on the determination result (S16), if the current change amount is greater than or equal to the reference current change amount, the analyzing portion 450 determines whether the present driving frequency is greater than or equal to a preset reference driving frequency (S18).

Then, based on the determination results (S16 and S18), if the current change amount is greater than or equal to the reference current change amount and the present driving frequency is greater than or equal to the preset reference driving frequency, the analyzing portion 450 generates a driving frequency control signal FCS for maintaining the present driving frequency and transmits the driving frequency control signal FCS to the control signal generator 420 (S20).

Then, based on the determination results (S16 and S18), if the current change amount is greater than or equal to the reference current change amount and the present driving frequency is smaller than the preset reference driving frequency, the analyzing portion 450 generates a driving frequency control signal FCS for increasing the driving frequency and transmits the driving frequency control signal FCS to the control signal generator 420 (S22).

Then, based on the determination result (S16), if the current change amount is smaller than the reference current change amount, the analyzing portion 450 determines whether the image change amount is greater than or equal to the reference image change amount (S30).

Then, based on the determination result (S30), if the image change amount is smaller than the reference image change amount, the analyzing portion 450 determines whether the present driving frequency is greater than or equal to the reference driving frequency (S32).

Then, based on the determination result (S32), if the present driving frequency is greater than the reference driving frequency, the analyzing portion 450 generates a driving frequency control signal FCS for reducing the driving frequency and transmits the driving frequency control signal FCS to the control signal generator 420 (S26).

That is, the current change amount which is smaller than the reference current change amount, and the image change amount which is smaller than the reference image change amount means that the image of the first frame is similar to the image of the second frame. Therefore, the light emitting display apparatus needs to be driven at a low frequency.

In this case, the present driving frequency which is greater than or equal to the reference driving frequency means that the light emitting display apparatus is driven at a high frequency.

This means that the light emitting display apparatus is driven at a high frequency in the condition in which the light emitting display apparatus should be driven at a low frequency. Therefore, the analyzing portion 450 may transmit the driving frequency control signal FCS for reducing the driving frequency to the control signal generator 420.

The control signal generator 420 generates driver control signals GCS and DCS so as to drive the light emitting display apparatus at a driving frequency lower than the present driving frequency, and transmits the driver control signals GCS and DCS to the gate driver 200 and the data driver 300. Accordingly, the display period DP may be increased or the blank period BP may be increased.

Then, based on the determination result (S32), if the current change amount is smaller than the reference current change amount, the image change amount is smaller than the reference image change amount, and the present driving frequency is smaller than the driving frequency, the analyzing portion 450 generates the driving frequency control signal FCS for maintaining the present driving frequency and transmits the driving frequency control signal FCS to the control signal generator 420 (S20).

That is, the current change amount which is smaller than the reference current change amount, and the image change amount which is smaller than the reference image change amount means that the image of the first frame is similar to the image of the second frame. Therefore, the light emitting display apparatus needs to be driven at a low frequency.

In this case, the present driving frequency which is smaller than the reference driving frequency means that the light emitting display apparatus is driven at a low frequency.

This means that the light emitting display apparatus is already driven at a low frequency in the condition in which the light emitting display apparatus should be driven at a low frequency.

Therefore, the analyzing portion 450 transmits the driving frequency control signal FCS for maintaining the present driving frequency to the control signal generator 420 (S20).

Then, based on the determination result (S30), if the current change amount is smaller than the reference current change amount and the image change amount is greater than or equal to the reference image change amount, the analyzing portion 450 determines whether the output position of the image is repeatedly shifted in the light emitting display panel (S34).

Next, if it is determined that the output position of the image is repeatedly shifted in the light emitting display panel (S34), the analyzing portion 450 determines whether the present driving frequency is greater than or equal to the preset reference driving frequency (S32).

Then, based on the determination result (S32), if the present driving frequency is greater than the reference driving frequency, the analyzing portion 450 generates the driving frequency control signal FCS for reducing the driving frequency and transmits the driving frequency control signal FCS to the control signal generator 420 (S26).

Then, based on the determination result (S32), if the present driving frequency is smaller than the reference driving frequency, the analyzing portion 450 generates the driving frequency control signal FCS for maintaining the driving frequency and transmits the driving frequency control signal FCS to the control signal generator 420 (S20).

That is, if the output position of the image is repeatedly shifted under the condition that the current change amount is smaller than the reference current change amount and the image change amount is greater than or equal to the reference image change amount, the image of the first frame and the image of the second frame are similar.

Therefore, if the light emitting display apparatus is driven at a driving frequency higher than the reference driving frequency (S32), the analyzing portion 450 transmits the driving frequency control signal FCS for reducing the driving frequency to the control signal generator 420 (S26). If the light emitting display apparatus is driven at a driving frequency lower than the reference driving frequency, the analyzing portion 450 may transmit the driving frequency control signal FCS for maintaining the present driving frequency to the control signal generator 420.

Next, if the image change amount is greater than the reference image change amount and it is not determined that the output position of the image is repeatedly shifted in the light emitting display panel (S34), the analyzing portion 450 determines whether the present driving frequency is greater than or equal to the preset reference driving frequency (S36).

Then, based on the determination results (S32 and S36), if it is not determined that the output position of the image is repeatedly shifted in the light emitting display panel and the present driving frequency is greater than the preset reference driving frequency, the analyzing portion 450 may transmit the driving frequency control signal FCS for maintaining the present driving frequency to the control signal generator 420.

That is, the current change amount which is smaller than the reference current change amount, the image change amount which is greater than the reference image change amount, and the output position of the image which is not shifted mean that the image of the first frame is different from the image of the second frame. Therefore, if the present driving frequency is greater than or equal to the preset reference driving frequency, the analyzing portion 450 may transmit the driving frequency control signal FCS for maintaining the driving frequency to the control signal generator 420.

Finally, based on the determination results (S32 and S36), if the output position of the image is not repeatedly shifted in the light emitting display panel and the present driving frequency is smaller than the preset reference driving frequency, the analyzing portion 450 may transmit the driving frequency control signal FCS for increasing the driving frequency to the control signal generator 420 (S22).

That is, the current change amount which is smaller than the reference current change amount, the image change amount which is greater than or equal to the reference image change amount, and the output position of the image which is not shifted mean that the image of the first frame is different from the image of the second frame. Therefore, if the present driving frequency is smaller than the reference driving frequency, the analyzing portion 450 may transmit the driving frequency control signal FCS for increasing the driving frequency to the control signal generator 420.

As described above, according to the present disclosure, the driving frequency of the light emitting display apparatus may be changed according to the analysis result of at least one of the current change amount, the image change amount, the present driving frequency, and the shift of the image.

Therefore, the power consumption of the light emitting display apparatus according to the present disclosure may be reduced when compared with the power consumption of the related art light emitting display apparatus continuously driven at a high frequency.

Also, in the light emitting display apparatus according to the present disclosure, the light emitting display apparatus may be driven at a high frequency if it needs to be driven at a high frequency, whereby the quality of the light emitting display apparatus may be maintained normally.

According to an embodiment of the present disclosure, when an image change amount or a current change amount is small, a low driving frequency may be used, ant thus, the power consumption of a light emitting display may be reduced, and thus, a low-power light emitting display may be provided.

Moreover, according to an embodiment of the present disclosure, when an image change amount or a current change amount is large, an image may be displayed by using a high driving frequency, and thus, a high-quality image may be displayed.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A light emitting display apparatus comprising:

an analyzing circuit configured to analyze at least one of image change amount and current change amount by analyzing input image data, and to generate a driving frequency control signal according to analysis results;

a control signal generator circuit for generating driver control signals for changing a period of outputting data voltages according to the driving frequency control signal, transmitting a gate control signal of the driver control signals to a gate driver, and transmitting data control signals of the driver control signals to a data driver; and a data aligning circuit for generating image data by rearranging the input image data transmitted from the analyzing circuit according to a structure of a light emitting display panel, and for outputting the image data to the data driver, wherein the analyzing circuit comprises a scaler provided in a control driver together with the control signal generator and the data aligning circuit or configured to change image information received through a communication network into a signal recognizable by the control driver.

2. The light emitting display apparatus according to claim 1, wherein the analyzing circuit analyzes the image change amount and the current change amount by comparing input image data of at least two frames.

3. The light emitting display apparatus according to claim 1, wherein the analyzing circuit analyzes the image change amount by comparing input image data of at least two frames, and analyzes the current change amount by using a current received from pixels included in the light emitting display panel.

4. The light emitting display apparatus according to claim 1, wherein the control signal generator generates the driver control signals for increasing or decreasing a blank period which is provided between display periods for outputting an image and is configured not to output an image.

5. The light emitting display apparatus according to claim 1, wherein the control signal generator generates the driver control signals for increasing or decreasing the size of the display period configured to output an image according to the driving frequency control signal.

6. The light emitting display apparatus according to claim 1, wherein, when the current change amount is greater than or equal to a preset reference current change amount and a present driving frequency is greater than or equal to a preset reference driving frequency, the analyzing circuit generates the driving frequency control signal for maintaining the present driving frequency, and when the current change amount is greater than or equal to the preset reference current change amount and the present driving frequency is less than the preset reference driving frequency, the analyzing circuit generates the driving frequency control signal for increasing the driving frequency.

7. The light emitting display apparatus according to claim 6, wherein the analyzing circuit generates the driving frequency control signal for maintaining the present driving frequency when the current change amount is smaller than the preset reference current change amount, the present driving frequency is smaller than the preset reference driving frequency and the image change amount is smaller than a preset reference image change amount.

8. The light emitting display apparatus according to claim 6, wherein the analyzing circuit generates the driving frequency control signal for maintaining the present driving frequency when the current change amount is less than the preset reference current change amount, the present driving frequency is smaller than the preset reference driving frequency, the image change amount is greater than or equal to a preset reference image change amount, and it is determined that an output position of the image is repeatedly shifted in the light emitting display panel.

9. The light emitting display apparatus according to claim 6, wherein the analyzing circuit generates the driving frequency control signal for increasing the present driving frequency when the current change amount is less than the preset reference current change amount, the present driving frequency is smaller than the preset reference driving frequency, the image change amount is greater than or equal to a preset reference image change amount, and it is not determined that an output position of the image is repeatedly shifted in the light emitting display panel.

10. The light emitting display apparatus according to claim 6, wherein the analyzing circuit generates the driving frequency control signal for decreasing the driving frequency when the current change amount is less than the preset reference current change amount, the present driving frequency is greater than or equal to the preset reference driving frequency, and the image change amount is less than a preset reference image change amount.

11. The light emitting display apparatus according to claim 6, wherein the analyzing circuit generates the driving frequency control signal for decreasing the driving frequency when the current change amount is less than the preset reference current change amount, the present driving frequency is greater than or equal to the preset reference driving frequency, the image change amount is greater than or equal to a preset reference image change amount, and it is determined that an output position of the image is repeatedly shifted in the light emitting display panel.

12. The light emitting display apparatus according to claim 6, wherein the analyzing circuit generates the driving frequency control signal for maintaining the present driving frequency when the current change amount is less than the preset reference current change amount, the present driving frequency is greater than or equal to the preset reference driving frequency, the image change amount is greater than or equal to a preset reference image change amount, and it is not determined that an output position of the image is repeatedly shifted in the light emitting display panel.

* * * * *